United States Patent
Feng et al.

(10) Patent No.: US 10,490,202 B2
(45) Date of Patent: *Nov. 26, 2019

(54) INTERFERENCE-FREE AUDIO PICKUP IN A VIDEO CONFERENCE

(71) Applicant: Polycom, Inc., San Jose, CA (US)

(72) Inventors: Jinwei Feng, Woburn, MA (US); Peter Chu, Lexington, MA (US)

(73) Assignee: Polycom, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/178,841

(22) Filed: Nov. 2, 2018

(65) Prior Publication Data

US 2019/0156849 A1 May 23, 2019

Related U.S. Application Data

(63) Continuation of application No. 15/640,385, filed on Jun. 30, 2017, now Pat. No. 10,134,414.

(51) Int. Cl.
| | |
|---|---|
| *G10L 21/0216* | (2013.01) |
| *H04N 7/15* | (2006.01) |
| *H04N 5/232* | (2006.01) |
| *G10L 25/57* | (2013.01) |
| *H04N 7/14* | (2006.01) |
| *H04S 7/00* | (2006.01) |
| *G01S 3/808* | (2006.01) |
| *H04R 1/40* | (2006.01) |
| *H04R 3/00* | (2006.01) |
| *G10L 21/0208* | (2013.01) |
| *G01S 5/28* | (2006.01) |

(52) U.S. Cl.
CPC ........ *G10L 21/0216* (2013.01); *G01S 3/8083* (2013.01); *G10L 25/57* (2013.01); *H04N 5/23219* (2013.01); *H04N 5/23296* (2013.01); *H04N 5/23299* (2018.08); *H04N 7/147* (2013.01); *H04N 7/15* (2013.01); *H04S 7/303* (2013.01); *G01S 5/28* (2013.01); *G10L 21/0208* (2013.01); *G10L 2021/02082* (2013.01); *G10L 2021/02087* (2013.01); *G10L 2021/02166* (2013.01); *H04R 1/406* (2013.01); *H04R 3/005* (2013.01); *H04R 2201/401* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,195,880 | B1 * | 11/2015 | Levoy | ................ G06K 9/00496 |
| 2007/0140555 | A1 * | 6/2007 | Iguchi | .................... G06T 11/60 |
| | | | | 382/167 |

(Continued)

*Primary Examiner* — Phung-Hoang J Nguyen
(74) *Attorney, Agent, or Firm* — Blank Rome, LLP (57) ABSTRACT

A videoconference apparatus at a first location detects audio from a location and determines whether the sound should be included in an audio-video stream sent to a second location, or excluded as an interfering noise. Determining whether to include the audio involves using a face detector to see if there is a face at the source of the sound. If a face is present, the audio data from the location will be transmitted to the second location. If a face is not present, additional motion checks are performed to determine whether the sound corresponds to a person talking, (such as a presenter at a meeting), or whether the sound is instead unwanted noise.

20 Claims, 6 Drawing Sheets

(56) References Cited

U.S. PATENT DOCUMENTS

| | | | |
|---|---|---|---|
| 2011/0285808 A1* | 11/2011 | Feng | H04N 7/142 |
| | | | 348/14.09 |
| 2012/0007890 A1* | 1/2012 | Choi | G06T 11/60 |
| | | | 345/635 |
| 2012/0050523 A1* | 3/2012 | Cook | H04N 7/188 |
| | | | 348/92 |
| 2013/0033596 A1 | 2/2013 | Crothers et al. | |

* cited by examiner

Continue Audio Pickup

FIG. 8B

INTERFERENCE-FREE AUDIO PICKUP IN A VIDEO CONFERENCE

CROSS-REFERENCE TO RELATED APPLICATIONS

This application is a continuation of U.S. application Ser. No. 15/640,385, filed Jun. 30, 2017, entitled "Interference-Free Audio Pickup in a Video Conference," the contents of which is incorporated herein in its entirety.

This application is related to U.S. application Ser. No. 15/017,262, filed Feb. 5, 2016, which claims priority to U.S. Provisional Application No. 62/112,525 filed Feb. 5, 2015, entitled "Face Brightening to Compensate for Back-Lighting," and U.S. application Ser. No. 29/673,968, filed on Jun. 30, 2017, entitled, "A People Detection Method for Auto-Framing and Tracking in a Video Conference," the contents of which applications are incorporated herein in their entirety.

TECHNICAL FIELD

This disclosure relates generally to multimedia communication, and more specifically to video conferencing in an environment which may be prone to having intermittent excessive background noise.

BACKGROUND

During a video conference, especially where an endpoint if location in a relatively open-space environment, unwanted background noise is, at best an annoying distraction. At best, such noise—such as from persons rudely talking in a hallway next to a room in which a presentation is being made—is an annoyance. At worst, the unwanted audio can make it hard or impossible for a participant at a far endpoint to hear a speaker properly.

It is a goal to provide one or more solutions to this problem.

SUMMARY

Embodiments of this disclosure pertain to one or more systems and methods for minimizing, preventing and/or preventing audio pickup of unwanted and undesirable noise not associated with a human speaker at an endpoint in a videoconferencing setting.

A microphone array calculates the pan, tilt and distance of a sound source from the array. The audio source can be a talking person. A face detector, coupled to the array, locates the face of the talking person in a video stream. A motion detector is configured to activate when the talker turns their face away from camera. The pan, tilt and distance information gathered by the array is compared to the video data. If a face is not detected at the audio source, then the audio signal is either muted or attenuated.

BRIEF DESCRIPTION OF THE DRAWINGS

For the purpose of illustration, there are shown in the drawings certain embodiments described in the present disclosure. In the drawings, like numerals indicate like elements throughout. It should be understood that the full scope of the inventions disclosed herein are not limited to the precise arrangements, dimensions, and instruments shown. In the drawings.

DETAILED DESCRIPTION

Reference will now be made in detail to implementations of the technology. Each example is provided by way of explanation of the technology only, not as a limitation of the technology. It will be apparent to those skilled in the art that various modifications and variations can be made in the present technology. For instance, features described as part of one implementation of the technology can be used on another implementation to yield a still further implementation. Thus, it is intended that the present encompass such modifications and variations.

Descriptions of terms used within this disclosure are provided as follows. 'Coupled' refers to components or devices which are able interact with one another, either directly or indirectly. All connected elements are coupled, but not all coupled elements are connected. Coupled elements include those which are in communication with each other. 'Proximity' refers to the degree to which items or elements or components etc. are close to one another. Elements are 'proximate' when they are near each other, as would be understood by a person of skill based on the context.

The technology described herein can be used in video conferencing environments which include one or more advanced camera devices such as smart cameras and one or more microphone arrays. In accordance with at least one embodiment, a videoconferencing system includes three components: at least one microphone array; face detection functionality; motion detection functionality. The (audio) information captured by a microphone array is used for calculating the pan, tilt and distance from a point in the array to the sound source (i.e., in audio space). Put more simply, the microphone array is used to determine where a sound is coming from. Beam forming or other sound source localization (SSL) method can be used to estimate, with a high degree of accuracy, from what point a sound is emanating. Face detection—that is, the automated analysis of video information for data consistent with or indicative of the presence of a human face—is used to locate one or more faces in video space. In accordance with at least one embodiment, if a sound source is determined not to correspond to a face, the sound from that location can be excluded from any transmission of sound data to a remote endpoint. For example, sound coming from a hallway, the sound of someone typing, or eating food, or rustling paper, would not have face at point from which these sounds came. Motion detection can be used to verify or nullify the combined results of the sound detector and face detector. For example, while a sound source may not correspond to a face at a particular moment, if it was previously determined that a face was present, the absence of motion in the areas nearby the point corresponding to the sound source and previous face, can be taken as a strong indication that whoever was speaking has not left their position, and hence the currently detected audio can continue to be included in the audio stream or audio-video stream being transmitted to a remote endpoint, such as a distant meeting location. This scenario would be consistent with, for example, a person turning their head away from the endpoint camera(s) while continuing to talk.

In accordance with at least one embodiment, an audio signal is muted/attenuated if the position of a sound source, calculated in terms of pan, tilt, and distance from data captured using the microphone array does not correspond to a face. The applicable gate logic thus opens only when the sound source is from an intended target—the face.

In accordance with at least one embodiment, an "interference blocker," as well as a "noise blocker," is provided. Embodiments herein enable audio tracking of a speaking person—targeted speech can continue to be picked up when a talker moves around a meeting room by continuously determining whether the source point of audio data matches face recognition/identification data. In accordance with at least one embodiment, the audio pickup of persons talking who are not the presenter can also be blocked. Even if an audio source (pan, tilt, direction) corresponds to a face. This can be achieved by requiring that audio data must also emanate from within an acceptable range of distance to be considered for transmission. That is, if the source of the sound is too close (less than a predetermined distance threshold) to, or too far (exceeding a predetermined distance threshold) from, the microphone array or some other predetermined point, the associated audio will be blocked though it corresponds to a face.

In accordance with at least one embodiment, the microphone for audio pickup can be a component of the microphone array used for locating the source of the sound in question, though this is not a requirement. Any existing pickup microphone that a videoconferencing system uses can work along with a microphone array as described herein. In such case, the gating control logic of the videoconferencing system is operative for the existing pickup microphone.

Turning now to the figures, in which like numerals represent like elements throughout the several views, embodiments of the present disclosure are described. For convenience, only some elements of the same group may be labeled with numerals. The purpose of the drawings is to describe embodiments and not for production. Therefore, features shown in the figures are chosen for convenience and clarity of presentation only. Moreover, the language used in this disclosure has been principally selected for readability and instructional purposes, and may not have been selected to delineate or circumscribe the inventive subject matter, resort to the claims being necessary to determine such inventive subject matter.

Each example is provided by way of explanation of the technology only, not as a limitation of the technology. It will be apparent to those skilled in the art that various modifications and variations can be made in the present technology. For instance, features described as part of one implementation of the technology can be used on another implementation to yield a still further implementation. Thus, it is intended that the present technology cover such modifications and variations that come within the scope of the technology.

Figure 1A:
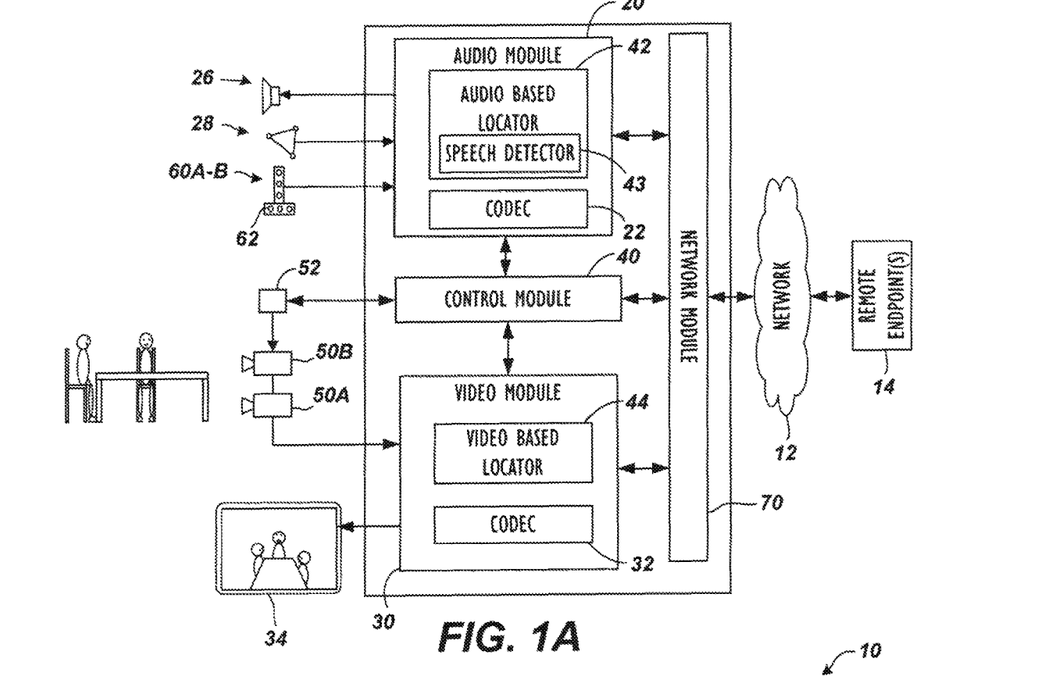
FIG. 1A illustrates a videoconferencing endpoint according to certain teachings of the present disclosure.

A videoconferencing apparatus or endpoint 10 in FIG. 1A communicates with one or more remote endpoints 14 over a network 12. Among some common components, the endpoint 10 has an audio module 20 with an audio codec 22 and has a video module 30 with a video codec 32. These modules 20/30 operatively couple to a control module 40 and a network module 70.

During a videoconference, two or more cameras 50A-B capture video and provide the captured video to the video module 30 and codec 32 for processing. Additionally, one or more microphones 28 (which can be comprised within a pod 29, as shown) capture audio and provide the audio to the audio module 20 and codec 22 for processing. These microphones 28 can be table or ceiling microphones, or they can be part of a microphone pod 29 or the like. The endpoint 10 uses the audio captured with these microphones 28 primarily for the conference audio.

Separately, microphone arrays 60A-B having orthogonally arranged microphones 62 also capture audio and provide the audio to the audio module 22 for processing. Preferably, the microphone arrays 60A-B include both vertically and horizontally arranged microphones 62 for determining locations of audio sources during the videoconference. Therefore, the endpoint 10 uses the audio from these arrays 60A-B primarily for camera tracking purposes and not for conference audio, although their audio could be used for the conference.

After capturing audio and video, the endpoint 10 encodes it using any of the common encoding standards, such as MPEG-1, MPEG-2, MPEG-4, H.261, H.263, H.264, G729, and G711. Then, the network module 70 outputs the encoded audio and video to the remote endpoints 14 via the network 12 using any appropriate protocol. Similarly, the network module 70 receives conference audio and video via the network 12 from the remote endpoints 14 and sends these to their respective codec 22/32 for processing. Eventually, a loudspeaker 26 outputs conference audio, and a display 34 outputs conference video. Many of these modules and other components can operate in a conventional manner well known in the art so that further details are not provided here.

In the embodiment shown, endpoint 10 uses the two or more cameras 50A-B in an automated and coordinated manner to handle video and views of the videoconference environment dynamically. Other cameras can also be used, in addition to or instead of cameras 50A-B. A first camera 50A can be a fixed or room-view camera, and a second camera 50B can be a controlled or people-view camera. Using the room-view camera 50A, for example, the endpoint 10 captures video of the room or at least a wide or zoomed-out view of the room that would typically include all the videoconference participants as well as some of the surroundings. Although described as fixed, the room-view camera 50A can actually be adjusted by panning, tilting, and zooming to control its view and frame the environment.

By contrast, the endpoint 10 uses the people-view camera 50B to capture video of one or more particular participants, and preferably one or more current speakers (an active talker), in a tight or zoomed-in view. Therefore, the people-view camera 50B is particularly capable of panning, tilting, and zooming. The captured view of a current speaker can be displayed in an active talker window or active talker view or active talker frame. Such a display can be done in high definition to enhance verisimilitude for teleconference participants.

In one arrangement, the people-view camera 50B is a steerable Pan-Tilt-Zoom (PTZ) camera, while the room-view camera 50A is an Electronic Pan-Tilt-Zoom (EPTZ) camera. As such, the people-view camera 50B can be steered, while the room-view camera 50A can be operated electronically to alter its viewing orientation rather than (or in addition to) being steerable. However, the endpoint 10 can use other arrangements and types of cameras. In fact, both cameras 50A-B can be steerable PTZ cameras. Moreover, switching between wide and zoomed views can be shared and alternated between the two steerable cameras 50A-B so that one captures wide views when appropriate while the other captures zoomed-in views and vice-versa.

For ease of understanding, one camera 50A is referred to as a room-view camera, while the other camera 50B is referred to as a people-view camera. Although it may be desirable to alternate between tight views of a speaker and wide views of a room, there may be situations where the endpoint 10 can alternate between two different tight views of the same or different speaker. To do this, it may be desirable to have the two cameras 50A-B both be steerable PTZ cameras as noted previously. In another arrangement, therefore, both the first and second cameras 50A-B can be a controlled or people-view camera, such as steerable PTZ cameras. The endpoint 10 can use each of these cameras 50A-B to capture video of one or more particular participants, and preferably one or more current speakers, in a tight or zoomed-in view as well as providing a wide or zoomed-out view of the room when needed.

In one implementation, the endpoint 10 outputs only video from one of the two cameras 50A-B at any specific time. As the videoconference proceeds, the output video from the endpoint 10 can then switch between the room-view and people-view cameras 50A-B from time to time. In general, the system 10 outputs the video from room-view camera 50A when there is no participant speaking (or operation has degraded), and the endpoint 10 outputs the video from people-view camera 50B when one or more participants are speaking. In one benefit, switching between these camera views allows the far-end of the videoconference to appreciate the zoomed-in views of active speakers while still getting a wide view of the meeting room from time to time.

As an alternative, the endpoint 10 can transmit video from both cameras simultaneously, and the endpoint 10 can let the remote endpoint 14 decide which view to show, especially if the endpoint 10 sends some instructions for selecting one or the other camera view. In yet another alternative, the endpoint 10 can transmit video from both cameras simultaneously so one of the video images can be composited as a picture-in-picture of the other video image. For example, the people-view video from camera 50B can be composited with the room-view from camera 50A to be sent to the far end in a picture-in-picture (PIP) format.

To control the views captured by the two cameras 50A-B, the endpoint 10 uses an audio based locator 42 and a video-based locator 44 to determine locations of participants and frame views of the environment and participants. Locators 42/44 can operate according to methods and algorithms discussed in greater detail below. Then, the control module 40 operatively coupled to the audio and video modules 20/30 uses audio and/or video information from these locators 42/44 to send camera commands to one or both of the cameras 50A-B to alter their orientations and the views they capture. For the people-view camera (or active talker) 50B, these camera commands can be implemented by an actuator or local control unit 52 having motors, servos, and the like that steer the camera 50B mechanically. For the room-view camera 50B, these camera commands can be implemented as electronic signals to be handled by the camera 50B.

To determine which camera 50A-B to use and how to configure its view, the control module 40 uses audio information obtained from the audio-based locator 42 and/or video information obtained from the video-based locator 44. For example and as described in more detail below, the control module 40 uses audio information processed by the audio based locator 42 from the horizontally and vertically arranged microphone arrays 60A-60B. The audio based locator 42 uses a speech detector 43 to detect speech in captured audio from the arrays 60A-60B and then determines a location of a current speaker. The control module 40 then uses the determined location to steer the people-view camera 50B toward that location. As also described in more detail below, the control module 40 uses video information processed by the video-based location 44 from the cameras 50A-B to determine the locations of participants, to determine the framing for the views, and to steer the people-view camera 50B at the participants. Locating one or more active talkers can be facilitated by methods and algorithms described herein.

The wide view from the room-view camera 50A can give context to the people-view camera 50B and can be used so that participants at the far-end do not see video from the people-view camera 50B as it moves toward a participant. In addition, the wide view can be displayed at the far-end when multiple participants at the near-end are speaking or when the people-view camera 50B is moving to direct at multiple speakers. Transitions between the two views from the cameras 50A-B can be faded and blended as desired to avoid sharp cut-a-ways when switching between camera views.

As the people-view camera 50B is moved toward the speaker, for example, the moving video from this camera 50B is preferably not transmitted to the far-end of the videoconference. Instead, the video from the room-view camera 50A is transmitted. Once the people-view camera 50B has properly framed the current speaker, however, the endpoint 10 switches between the video from the cameras 50A-B.

All the same, the endpoint 10 preferably does not simply switch automatically to capture views of speakers. Instead, camera changes are preferably timed. Too many camera switches over a period of time can be distracting to the conference participants. Accordingly, the endpoint 10 preferably tracks those speakers using their locations, their voice characteristics, their frequency of speaking, and the like. Then, when one speaker begins speaking, the endpoint 10 can quickly direct the people-view camera 50B at that frequent speaker, but the endpoint 10 can avoid or delay jumping to another speaker who may only be responding with short answers or comments.

Although the endpoint 10 preferably operates without user intervention, the endpoint 10 may allow for user intervention and control. Therefore, camera commands from either one or both of the far and near ends can be used to control the cameras 50A-B. For example, the participants can determine the best wide view to be displayed when no one is speaking. Meanwhile, dynamic camera commands can control the people-view camera 50B as the videoconference proceeds. In this way, the view provided by the people-view camera 50B can be controlled automatically by the endpoint 10.

Figure 1B:
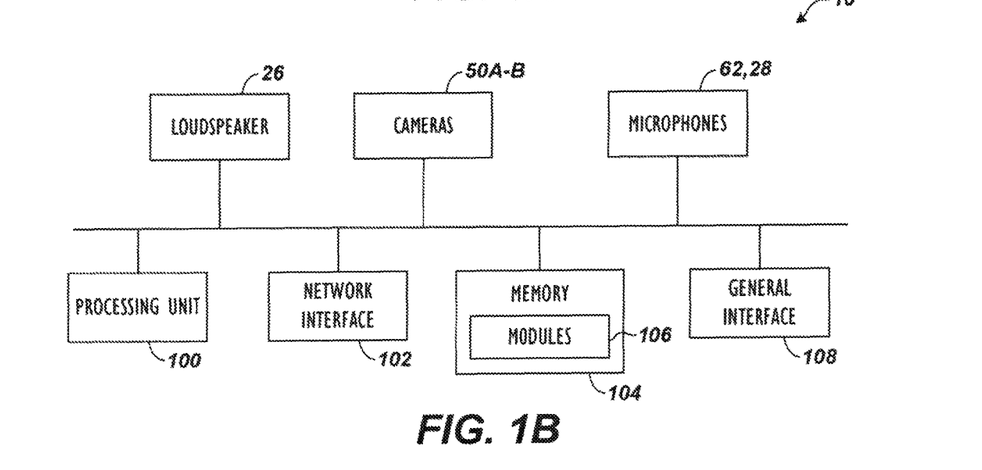
FIG. 1B illustrates components of the videoconferencing endpoint of FIG. 1A.

FIG. 1B shows some exemplary components for the videoconferencing endpoint 10 of FIG. 1A. As shown and discussed above, the endpoint 10 has two or more cameras 50A-B and several microphones 28/62A-B. In addition to these, the endpoint 10 has a processing unit 100, a network interface 102, memory 104, and a general input/output (I/O) interface 108 all coupled via a bus 101.

The memory 104 can be any conventional memory such as SDRAM and can store modules 106 in the form of software and firmware for controlling the endpoint 10. In addition to video and audio codecs and other modules discussed previously, the modules 106 can include operating systems, a graphical user interface (GUI) that enables users to control the endpoint 10, and algorithms for processing audio/video signals and controlling the cameras 50A-B as discussed later.

The network interface 102 provides communications between the endpoint 10 and remote endpoints (not shown). By contrast, the general I/O interface 108 provides data transmission with local devices such as a keyboard, mouse, printer, overhead projector, display, external loudspeakers, additional cameras, microphone pods, etc. The endpoint 10 can also contain an internal loudspeaker 26.

The cameras 50A-B and the microphone arrays 60A-B capture video and audio, respectively, in the videoconference environment and produce video and audio signals transmitted via the bus 101 to the processing unit 100. Here, the processing unit 100 processes the video and audio using algorithms in the modules 106. For example, the endpoint 10 processes the audio captured by the microphones 28/62A-B as well as the video captured by the cameras 50A-B to determine the location of participants and direct the views of the cameras 50A-B. Ultimately, the processed audio and video can be sent to local and remote devices coupled to interfaces 102/108.

Figure 1C:
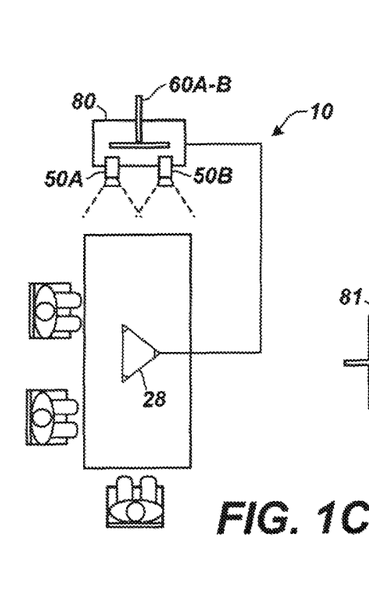
FIGS. 1C-1D show plan views of videoconferencing endpoints.

In the plan view of FIG. 1C, one arrangement of the endpoint 10 uses a videoconferencing device 80 having microphone arrays 60A-B and two cameras 50A-B integrated therewith. A microphone pod 29 can be placed on a table, although other types of microphones, such as ceiling microphones, individual table microphones, and the like, can be used. The microphone pod 29 communicatively connects to the videoconferencing device 80 and captures audio for the videoconference. For its part, the device 80 can be incorporated into or mounted on a display and/or a videoconferencing unit (not shown).

Figure 1D:
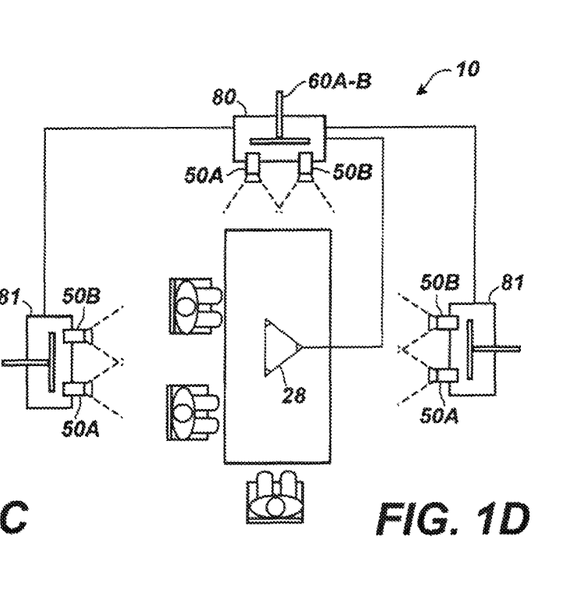

FIG. 1D shows a plan view of another arrangement of the endpoint 10. Here, the endpoint 10 has several devices 80/81 mounted around the room and has a microphone pod 29 on a table. One main device 80 has microphone arrays 60A-B and two cameras 50A-B as before and can be incorporated into or mounted on a display and/or videoconferencing unit (not shown). The other devices 81 couple to the main device 80 and can be positioned on sides of the videoconferencing environment.

The auxiliary devices 81 at least have a people-view camera 50B, although they can have a room-view camera 50A, microphone arrays 60A-B, or both and can be the same as the main device 80. Either way, audio and video processing described herein can identify which people-view camera 50B has the best view of a speaker in the environment. Then, the best people-view camera 50B for the speaker can be selected from those around the room so that a frontal view (or the one closest to this view) can be used for conference video.

Figures 2A, 2B, 2C, 2D:
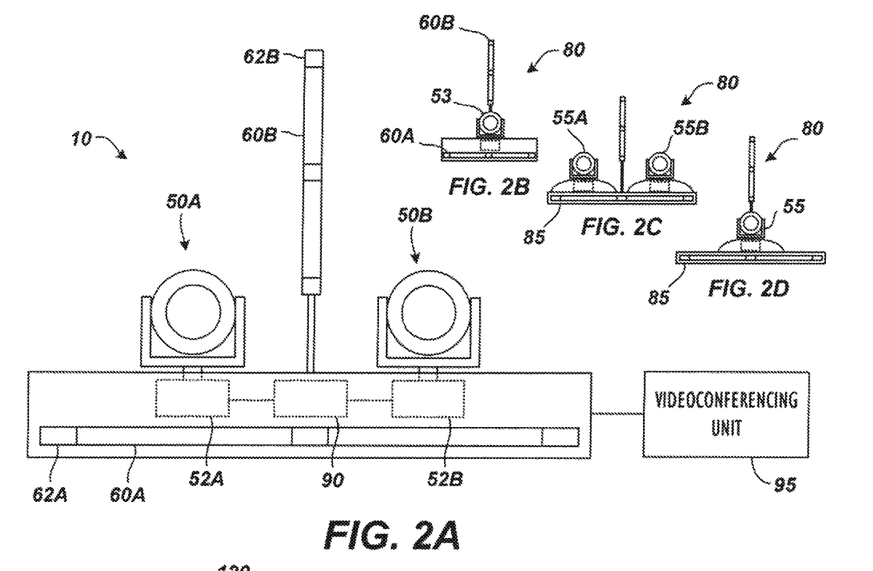
FIG. 2A shows a videoconferencing device for an endpoint according to the present disclosure.
FIGS. 2B-2D show alternate configurations for the videoconferencing device.

Before turning to operation of the endpoint 10 during a videoconference, discussion first turns to details of a videoconferencing device according to the present disclosure. As shown in FIG. 2A, a videoconferencing device 80 has a housing with a horizontal array 60A of microphones 62A disposed thereon. Extending from this housing, a vertical array 60B also has several microphones 62B. As shown, these arrays 60A-B can each have three microphones 62A-B, although either array 60A-B can have a different number than depicted.

The first camera 50A is the room-view camera intended to obtain wide or zoomed-out views of a videoconference environment. The second camera 50B is the people-view camera intended to obtain tight or zoomed-in views of videoconference participants. These two cameras 50A-B are mounted on the housing of the device 80 and can be integrated therewith. The room-view camera 50A has image processing components 52A that can include an actuator if not an EPTZ camera. The people-view camera 50B also has image processing components 52B that include an actuator to control the pan-tilt-zoom of the camera's operation. These components 52A-B can be operatively coupled to a local control unit 90 housed in the device 80.

For its part, the control unit 90 can include all or part of the necessary components for conducting a videoconference, including audio and video modules, network module, camera control module, etc. Alternatively, all or some of the necessary videoconferencing components may be housed in a separate videoconferencing unit 95 coupled to the device 80. As such, the device 80 may be a stand-alone unit having the cameras 50A-B, the microphone arrays 60A-B, and other related components, while the videoconferencing unit 95 handles all of the videoconferencing functions. Of course, the device 80 and the unit 95 can be combined into one unit if desired.

Rather than having two or more integrated cameras 50A-B as in FIG. 2A, the disclosed device 80 as shown in FIG. 2B can have one integrated camera 53. Alternatively as shown in FIGS. 2C-2D, the device 80 can include a base unit 85 having the microphone arrays 60A-B, communication ports (not shown), and other processing components (not shown). Two or more separate camera units 55A-B can connect onto the base unit 85 to make the device 80 (see FIG. 2C), or one separate camera unit 55 can be connected thereon (see FIG. 2D). Accordingly, the base unit 85 can hold the microphone arrays 60A-B and all other required electronic and signal processing components and can support the one or more camera units 55 using an appropriate form of attachment.

Although the device 80 has been shown having two cameras 50A-B situated adjacent to one another, either one or both of the cameras 50A-B can be entirely separate from the device 80 and connected to an input of the housing. In addition, the device 80 can be configured to support additional cameras instead of just two. In this way, users could install other cameras, which can be wirelessly connected to the device 80 and positioned around a room, so that the device 80 can always select the best view for a speaker. It will be apparent to a person of skill in the art that other configurations are possible which fall within the scope of the appended claims.

Figure 3:
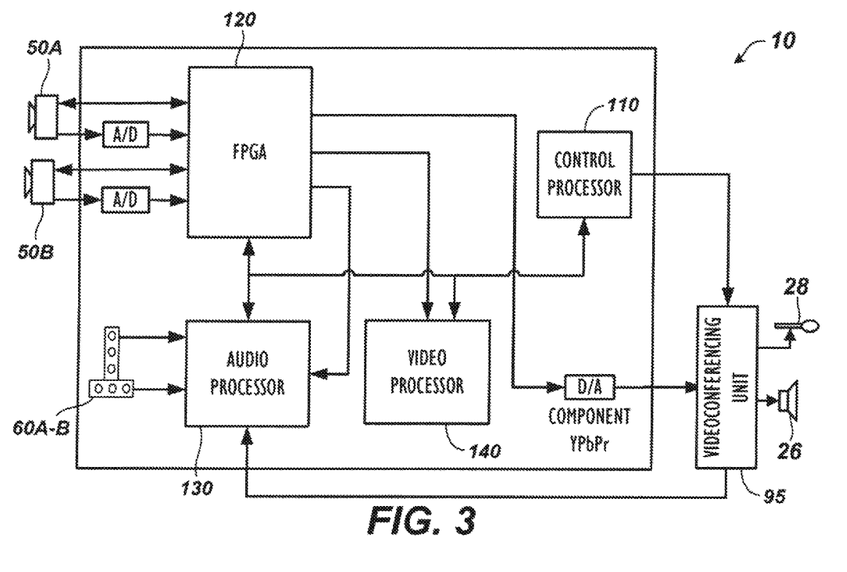
FIG. 3 illustrates components of the videoconferencing device of FIGS. 2A-2D.

FIG. 3 shows some components that can be part of the device 80 of FIGS. 2A-2D. As shown, the device 80 includes the microphone arrays 60A-B, a control processor 110, a Field Programmable Gate Array (FPGA) 120, an audio processor 130, and a video processor 140. As noted previously, the device 80 can be an integrated unit having the two or more cameras 50A-B integrated therewith (See FIG. 2A), or these cameras 50A-B can be separate units having their own components and connecting to the device's base unit (See FIG. 2C). In addition, the device 80 can have one integrated camera (53; FIG. 2B) or one separate camera (55; FIG. 2D).

During operation, the FPGA 120 captures video inputs from the cameras 50A-B, generates output video for the videoconferencing unit 95, and sends the input video to the video processor 140. The FPGA 120 can also scale and composite video and graphics overlays. The audio processor 130, which can be a Digital Signal Processor, captures audio from the microphone arrays 60A-B and performs audio processing, including echo cancelation, audio filtering, and source tracking. The audio processor 130 also handles rules for switching between camera views, for detecting conversational patterns, and other purposes disclosed herein.

The video processor 140, which can also be a Digital Signal Processor (DSP), captures video from the FPGA 120 and handles motion detection, face detection, and other video processing to assist in tracking speakers. As described in more detail below, for example, the video processor 140 can perform a motion detection algorithm on video captured from the people-view camera 50B to check for motion in the current view of a candidate speaker location found by a speaker tracking algorithm. A speaker tracking module can include one or more algorithms as detailed below. In addition, the video processor 140 can use a face-finding algorithm to further increase the tracking accuracy by confirming that a candidate speaker location does indeed frame a view having a human face.

The control processor 110, which can be a general-purpose processor (GPP), handles communication with the videoconferencing unit 95 and handles camera control and overall system control of the device 80. For example, the control processor 110 controls the pan-tilt-zoom communication for the cameras' components and controls the camera switching by the FPGA 120.

Figure 4:
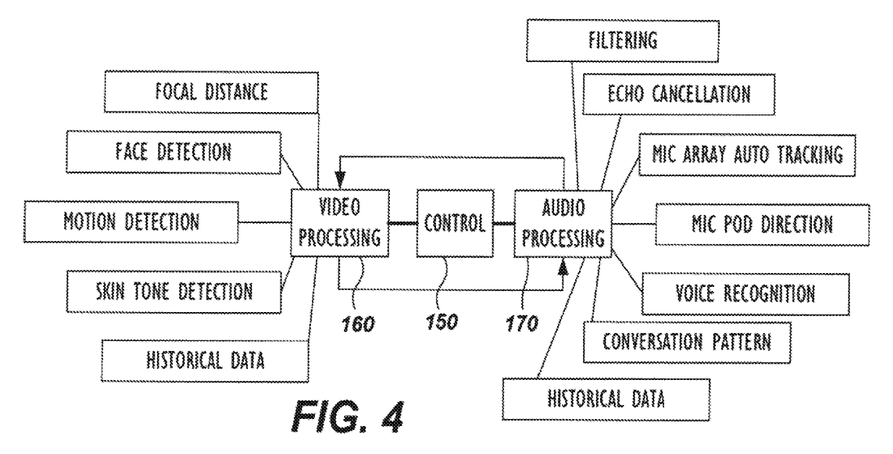
FIG. 4 illustrates a control scheme for the disclosed endpoint using both audio and video processing.
Figure 5:
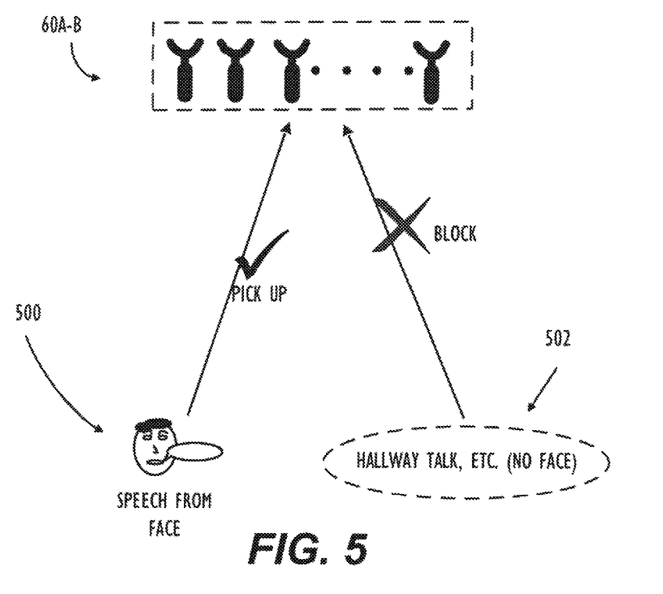
FIG. 5 illustrates an example configuration of a microphone array in accordance with an embodiment of this disclosure.

With an understanding of the videoconferencing endpoint and components described above, discussion now turns to operation of the disclosed endpoint 10. FIG. 4 shows a control scheme 150 used by the disclosed endpoint 10 to conduct a videoconference. As intimated previously, the control scheme 150 uses both video processing 160 and audio processing 170 to control operation of the cameras 50A-B during the videoconference. The processing 160 and 170 can be done individually or combined together to enhance operation of the endpoint 10. Although briefly described below, several of the various techniques for audio and video processing 160 and 170 are discussed in more detail later.

Briefly, the video processing 160 can use focal distance from the cameras 50A-B to determine distances to participants and can use video-based techniques based on color, motion, and facial recognition to track participants. As shown, the video processing 160 can, therefore, use motion detection, skin tone detection, face detection, and other algorithms to process the video and control operation of the cameras 50A-B. Historical data of recorded information obtained during the videoconference can also be used in the video processing 160.

For its part, the audio processing 170 uses speech tracking with the microphone arrays 60A-B. To improve tracking accuracy, the audio processing 170 can use a number of filtering operations known in the art. For example, the audio processing 170 preferably performs echo cancellation when performing speech tracking so that coupled sound from the endpoint's loudspeaker is not picked up as if it were coming from a dominant speaker. The audio processing 170 also uses filtering to eliminate non-voice audio from voice tracking and to ignore louder audio that may be from a reflection.

Figure 6:
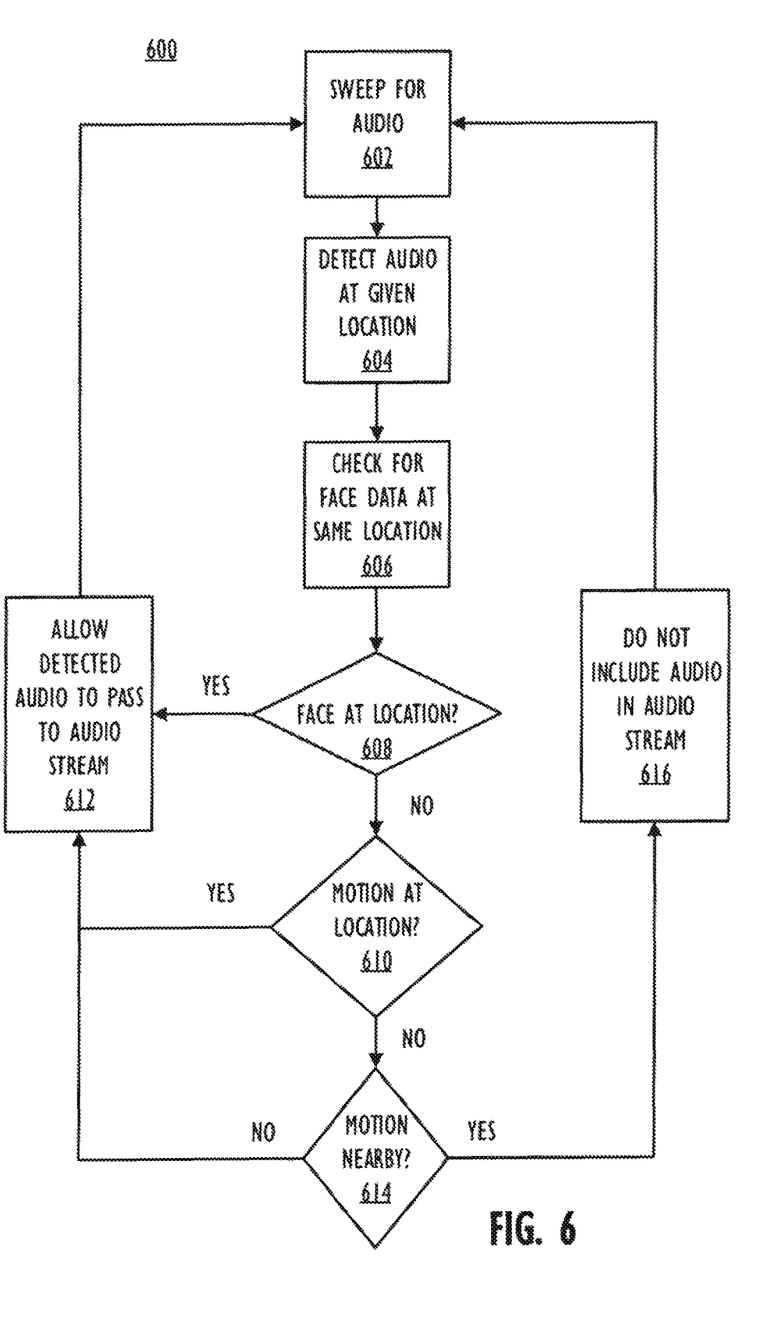
FIG. 6 illustrates a method for interference free audio pickup in accordance with an embodiment of this disclosure.

FIG. 6 illustrates a method 600 of interference-free audio pickup in a videoconference. As discussed herein, the microphone array checks 602 for audio in an environment. If the method 600 detects audio at a particular location (see FIG. 7), the method will check 606 to see if there is a face at the same location. CPU 100 of videoconferencing system 10 can run or execute suitable face detection algorithm to determine if a face is present at the sound source. If the face detector determines 608 that there is a face present, the audio will be included 612 in the audio stream to be shared with a remote endpoint. If a face is not present, the method 600 uses a motion detector to check 610 for motion at the location, (see FIG. 9). If there is motion at the source of the audio, such as would be consistent with head movement or lip movement, for example, the audio will be included 612 in the audio stream to be shared with a remote endpoint. If no motion is present at the location of the sound, the method will check for motion nearby, as would be consistent with a person having moved from the location. If no motion (moving pixels) are detected nearby, the audio will be included 612 in the audio stream to be shared with a remote endpoint. On the other hand, if motion has occurred nearby, the audio will not be included 612 in the audio stream. Whether the audio is included in the audio (audio-video) stream 612 or not 616, the method will continue to sweep 602 the meeting environment for audio and assess whether detected audio corresponds to a meeting presenter or active talker, or is just interference noise, and include 612 the audio or not include 616 the audio as appropriate.

Figure 7:
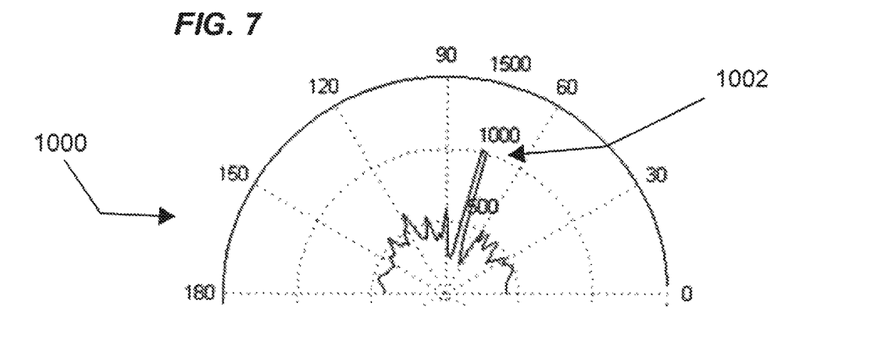
FIG. 7 illustrates a beamforming plot in accordance with an embodiment of this disclosure.

FIG. 7 illustrates an example beamforming plot 1000 which can be used to detect sources of sound in a meeting environment, as discussed with regard to steps 602-604 in FIG. 6. As illustrated, beamforming takes the sum of all microphone signal energy while accounting for the phase of each signal. There is a peak 1002 visible in the plot 1000. It will thus be understood to persons of skill in the art, having considered this disclosure, that peak 1002 corresponds to the pan angle of a talker. In accordance with at least one embodiment, tilt estimation is done using a vertical array, in the same way that pan estimation is done using a horizontal array.

As described above, motion data from video information is used to cover some difficult cases, such as people facing away from the camera, (see e.g., steps 610 and 614 of FIG. 6). In such cases, a face detector could cause false negatives. Most people tend to move when they speak. Such motion can include lip movement, eye blinking, head/body movement, etc. Therefore, a true angle of a speaker can be chosen from among the candidate angles when the angle (+/−10 degrees, for example) is also associated with motion. In other words, the angles corresponding to the wall reflections can be ignored even if the magnitude and phase information from the audio portion of the algorithm causes them to be indicated as stronger signals. By the same token, by checking for motion at the candidate angle, the angle can be discounted if no motion is found at that angle.

Video motion can be computed in a variety of ways. In some embodiments, it can be computed by taking the absolute difference between two video frames of the 360-degree panoramic room view (say, 1056×144), time-spaced 160 milliseconds apart. Other resolutions or time spacing can also be used if desired or appropriate in a given embodiment. A pixel can be declared to be a motion pixel when the difference is greater than a predefined threshold. In other embodiments, motion vectors for particular pixels or blocks can be used, as well as other known motion detection algorithms.

Motion information is analyzed in short periods, every two seconds for example. If motion is not detected corresponding to a candidate angle in that period, the candidate angle will be reconsidered. The motion data will also be stored for longer periods (15 or 30 seconds, for example). This is because while a person may not move in the shorter period, he or she will still tend to move in the longer period. The longer term motion can then be an indication that the detected audio is coming from the location of the motion. However, reliance on the longer term motion can be tempered by checking for motion in nearby regions during the same extended period. If motion is also detected in surrounding nearby regions, this is a strong indication that the detected motion is caused by motion of the camera itself. The results will thus be disregarded and the algorithm will be run again (as it would be in any case). This is because the device might shake occasionally causing the false video motion.

Figure 8A:
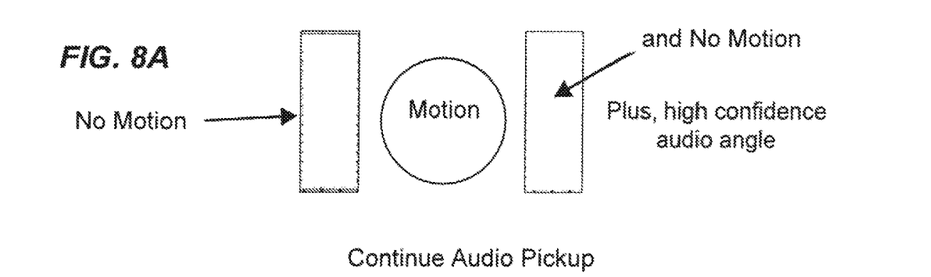
FIG. 8A-8B illustrate implementations of motion-analysis algorithms in accordance with an embodiment of this disclosure.

Consider the situation where it has been determined that an active talker has been talking at a given angle for longer period of time. That candidate angle can still be considered a strong candidate to be a true angle, even if the above discussed algorithms would indicate that it is a less probable candidate in the most recent period, (two seconds, for example). If motion is detected at that angle, and motion is not detected in nearby regions (as illustrated in FIG. 8A), the likelihood is that the angle corresponding to the motion is nevertheless correct. In contrast, even if motion is detected at that angle, if motion is also detected to the left or right of the angle, no additional weight will be given to that angle, and the rankings of the angles will be as discussed above. Thus, if a candidate angle had been consistently identified as a strong candidate angle, the candidacy of that angle can still be given great weight, even if not currently indicated as strong.

Figure 8B:
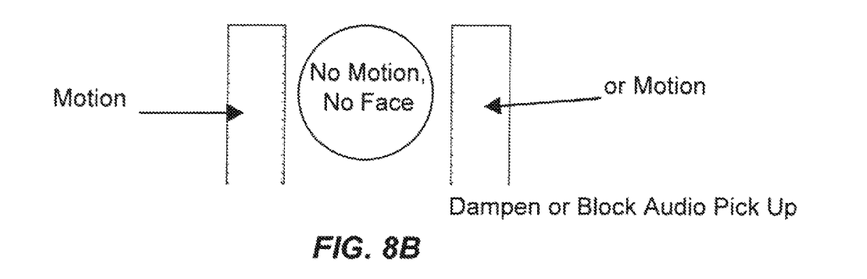

Audio from a given angle (location) can thus be included in the outgoing audio data stream if there is motion at the angle and/or there is no motion to the left and right of the angle, and the determined audio angle has a high confidence level, such as due to there having been a face at the location very recently, (FIG. 8A). Conversely, when a person leaves their seat, they will leave to either the left or right of the seat (as perceived by the camera). So when motion is detected in either one of the regions, and neither a face (608) nor motion (610) is present at the location, (see FIG. 8B), the speaker previously detected at the location has probably moved, and hence the audio in question is merely interference noise and should be exclude or dampened.

One or more acts in accordance with flow chart steps or process steps may be performed by a programmable control device executing instructions organized into one or more program modules on a non-transitory programmable storage device. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Non-transitory programmable storage devices, sometimes called a computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

Embodiments within this disclosure can include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Embodiments of the disclosure may be practiced in network computing environments with many types of computer system configurations, including personal computers, handheld devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only, and should not be construed so as to limit the scope of the disclosure. Various modifications and changes can be made to the principles and embodiments described herein without departing from the scope of the disclosure and without departing from the claims which follow. Any element in a claim that does not explicitly state "means for" performing a specified function, or "step for" performing a specific function, is not to be interpreted as a "means" or "step" clause as specified in 35 U.S.C § 112, sixth paragraph.

The invention claimed is:

1. A method for providing interference-free audio pickup in a video conference, the method comprising:
   detecting audio data in an environment, using a plurality of microphones;
   determining, at a processor, a first location of a source of the audio data, using a beamforming algorithm;
   detecting first facial data in the environment, using a camera;
   determining, at the processor, a second location of a source of the first facial data;
   determining, at a first time, using the processor, that the second location corresponds to the first location, and responsive to determining that the first location corresponds to the second location, including the audio data in an audio stream;
   checking, at a second time, for second facial data corresponding to the first location;
   determining, responsive to checking at the second time, a first absence of second facial data;
   checking, at a third time, for motion at the first location, responsive to determining the first absence of second facial data;
   determining, responsive to checking at the third time, a presence of motion at the first location; and
   continuing to include the audio data responsive, at least in part, determining the presence of motion at the first location.

2. The method of claim 1, wherein detecting the audio data in the environment using the plurality of microphones comprises detecting the audio data in the environment using at least one array of microphones.

3. The method of claim 1, wherein detecting the audio data in the environment using the plurality of microphones comprises detecting the audio data using a first array of microphones and a second array of microphones, the first array of microphones orthogonal to the second array of microphones.

4. The method of claim 1, further comprising:
   checking, at a fourth time, for motion in a region proximate the first location, responsive to determining the first absence of second facial data corresponding to the first location;
   determining, responsive to checking at the fourth time, an absence of motion in the region proximate the first location; and
   continuing to include the audio data responsive, at least in part, to determining the absence of motion in the region proximate the first location.

5. The method of claim 4, wherein the third time and the fourth time are different.

6. The method of claim 1, wherein detecting first facial data in the environment using the camera comprises detecting a skin tone.

7. The method of claim 1, wherein checking, at the third time, for motion at the first location, responsive to determining the first absence of second facial data corresponding to the first location comprises checking for one or more of eye lid movement, lip movement, head movement and body movement.

8. The method of claim 1, wherein determining the first location of the source of the audio data using the processor comprises using a beamforming algorithm.

9. A non-transitory computer readable medium, the non-transitory computer readable medium storing instructions executable by a processor, the instructions comprising instructions to:
   detect, using a plurality of microphones, audio data in an environment;
   determine a first location of a source of the audio data;
   detect, using a camera, first facial data in the environment;
   determine a second location of a second source of the first facial data;
   determine at a first time, that the second location corresponds to the first location and in response, include the audio data in an audio stream;
   check, at a second time, for second facial data corresponding to the first location;
   determine, in response to checking at the second time, a first absence of second facial data corresponding to the first location;
   check, in response to determining the first absence of second facial data corresponding to the first location, for motion at the first location at a third time;
   determine, in responsive to checking at the third time, a presence of motion at the first location; and
   continue to include the audio data, in response to determining the presence of motion at the first location responsive.

10. The non-transitory computer readable medium of claim 9, the instructions further comprising instructions to detect audio data in the environment using the plurality of microphones comprise instructions to detect the audio data using a first array of microphones and a second array of microphones, the first array of microphones orthogonal to the second array of microphones.

11. The non-transitory computer readable medium of claim 9, the instructions further comprising instructions to:
   check, at a fourth time, for motion in a region proximate the first location, responsive to determining the first absence of second facial data corresponding to the first location;
   determine, responsive to checking at the fourth time, an absence of motion in the region proximate the first location; and
   continue to include the audio data responsive, at least in part, to determining the absence of motion in the region proximate the first location.

12. The non-transitory computer readable medium of claim 11, wherein the third time precedes and the fourth time.

13. The non-transitory computer readable medium of claim 9, wherein the instructions to detect first facial data in the environment using the camera further comprise instructions to detect a skin tone.

14. The non-transitory computer readable medium of claim 9, wherein the instructions to check, at the third time, for motion at the first location, responsive to determining the first absence of second facial data corresponding to the first location further comprise instructions to check for at least one of eye lid movement, lip movement, head movement or body movement.

15. The non-transitory computer readable medium of claim 9, wherein the instructions to determine the first location of the source of the audio data comprise a beamforming algorithm.

16. A video conferencing apparatus, comprising:

a processor;

a camera coupled to the processor;

a plurality of microphones coupled to the processor; and a memory coupled to the processor and storing instructions executable by the processor, the instructions comprising instructions to:

detect, using the plurality of microphones, audio data in an environment;

determine a first location of a source of the audio data;

detect, using the camera, first facial data in the environment;

determine a second location of a second source of the first facial data;

determine at a first time, that the second location corresponds to the first location and in response, include the audio data in an audio stream;

check, at a second time, for second facial data corresponding to the first location;

determine, in response to checking at the second time, a first absence of second facial data corresponding to the first location;

check, in response to determining the first absence of second facial data corresponding to the first location, for motion at the first location at a third time;

determine, in responsive to checking at the third time, a presence of motion at the first location; and continue to include the audio data, in response to determining the presence of motion at the first location responsive.

17. The video conferencing apparatus of claim 16, wherein the instructions further comprise instructions to:

check, at a fourth time, for motion in a region proximate the first location, responsive to determining the first absence of second facial data corresponding to the first location;

determine, responsive to checking at the fourth time, an absence of motion in the region proximate the first location; and continue to include the audio data responsive, at least in part, to determining the absence of motion in the region proximate the first location.

18. The video conferencing apparatus of claim 17, wherein the fourth time precedes and the third time.

19. The video conferencing apparatus of claim 16, wherein the instructions to check at the third time for motion at the first location responsive to determining the first absence of second facial data corresponding to the first location further comprise instructions to check for at least one of eye lid movement, lip movement, head movement or body movement.

20. The video conferencing apparatus of claim 16, wherein the instructions to determine the first location of the source of the audio data comprise beamforming instructions.

* * * * *